March 24, 1970 G. NEIDL 3,502,274
COMMINUTING PUMP
Filed May 3, 1965 2 Sheets-Sheet 1

INVENTOR
GEORGE NEIDL

BY Fisher, Christen, Sabol & Caldwell
ATTORNEYS

March 24, 1970　　　　　G. NEIDL　　　　3,502,274
COMMINUTING PUMP

Filed May 3, 1965　　　　　　　　　　2 Sheets-Sheet 2

INVENTOR
GEORGE NEIDL

BY Fisher, Christen, Sabol & Caldwell
ATTORNEYS

United States Patent Office 3,502,274
Patented Mar. 24, 1970

3,502,274
COMMINUTING PUMP
Georg Neidl, Im Bisch 664, Schaan,
Principality of Liechtenstein
Filed May 3, 1965, Ser. No. 452,502
Int. Cl. B07b 13/00, 1/00, 15/00
U.S. Cl. 241—46.11    7 Claims

ABSTRACT OF THE DISCLOSURE

The pump chamber in which an inclined rotor is operated in contact with the walls of the chamber is enclosed in a housing with which it communicates through strainer passages in the separating wall. An outlet for heavy particles separated in the pump chamber passes through the housing in sealed relationship thereto while the finer particles expelled from the pump chamber through said passages into the housing are discharged therefrom by a separate outlet.

---

This invention relates to rotary pumps of the type disclosed in my prior patents, Nos. 2,956,503; 3,005,597, 3,060,862; 3,067,960; 3,113,734 and 3,120,353 and more particularly to the development of said type of machines, as e.g. shown in FIGS. 2 and 3 of Patent No. 3,113,734, for separating solids and liquids.

In all known filter constructions, whether they used centrifugal force, screens, vacuum, pressure, filter cloth, filter drums, or other means, the filtering machine was construed as a separate single purpose unit. Said constructions presented, in addition, always the difficulty that the filter openings readily clogged and had to be cleaned in relatively short time intervals by scrapers or other means.

It is a principal object of the invention to provide a machine which avoids said drawbacks.

A further object of the invention is to provide a machine which allows of combining processing operations such as mixing, tearing, comminuting, grinding, homogenizing, centrifuging, milling, kneading as well as separating, sorting, distilling with a filtering and pumping action.

Further objects and advantages of the present invention will be apparent from the following description, reference being had to the accompanying drawings, wherein preferred embodiments of the invention are shown by way of example.

Figure 1:
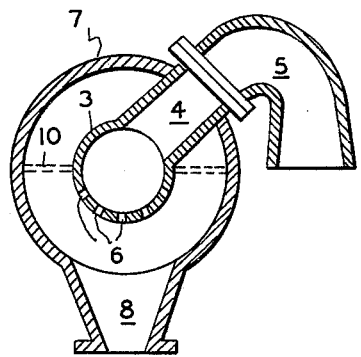
FIGS. 1 and 1a show a machine, in cross section and side elevation, incorporating the basic principle of this invention.
Figure 1A:
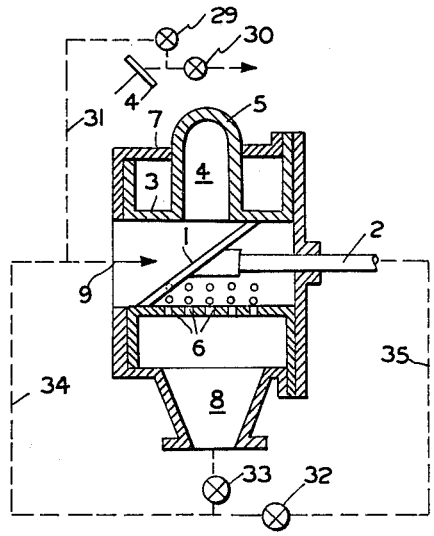

Referring now in detail to the drawings and more specifically to FIGS. 1 and 1a, a rotor 1 is secured obliquely to a shaft 2 and rotates in the housing 3. Said housing is provided with a pressure nipple 4 as described in my patents referred to above, which nipple opens into the outlet 5. The nipple 4 passes through the housing 3 in sealed relationship thereto and is shown extending upwardly inclined but may have any rotational position in the vertical plane and may, in particular, lead straight upwardly. The housing 3 is provided with perforations or apertures 6, and the whole system is placed in a second housing 7 having an outlet nipple 8.

In operation, the material enters at 9; the heavier portions are ejected by the centrifugal force through 4 and 5 while the lighter portions, which are also smaller, are separated through the perforations 6 and are discharged at 8.

The housing 7 can be designed as a half-cylinder, closed by the wall 10, as shown in FIG. 1 in dotted lines. In this case, the perforations 6 must, of course, be limited to the lower half circle of the housing 3.

If apertures 6 extend farther around the housing 3, the housing 7 should be designed as a full cylinder to prevent splashing of fluid through the uncovered apertures.

For pumps of this construction, it is frequently of advantage to make the rotor not circular but elliptical as also explained in detail in my prior patents.

Figure 2:
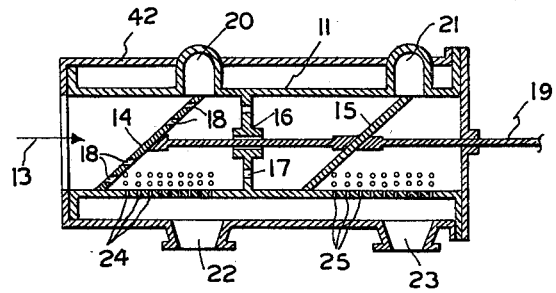
FIG. 2 shows a machine with double rotor.

FIG. 2 shows, in principle, the same machine as FIGS. 1 and 1a but as a double acting modification with two rotors 14 and 15 in a single pump housing 11 concentrically enclosed in the outer housing 12. The material to be pumped and filtered enters at 13. The two working chambers in the housing 11 can be separated by a partition 16, which must be perforated by apertures 17.

If the rotor 14 has a circular shape, the feed entering at 13 can pass over its circumference, which, viewed in the direction of the arrow 13, is elliptical, to the apertures 17 and therethrough to the working chamber 15. If, however, the rotor 14 has elliptical shape, apertures 18 have to be provided. Said apertures have about 1/10 the size of the diameter of the housing 11.

If the partition 16 is omitted, very strong turbulence is produced by the two rotors 14 and 15. Such turbulence is desirable for many processes.

The two rotors 14 and 15 may have different shapes. Both rotate with shaft 19. Part of the charge is centrifuged through the outlets 20 and 21, the other part is discharged via the openings 24 and 25 through the outlets 22 and 23 in the housing 11. Said openings are smaller than the apertures 18; the openings 24 may be, e.g. 1/20 to 1/40 of the diameter of the housing.

Figure 3:
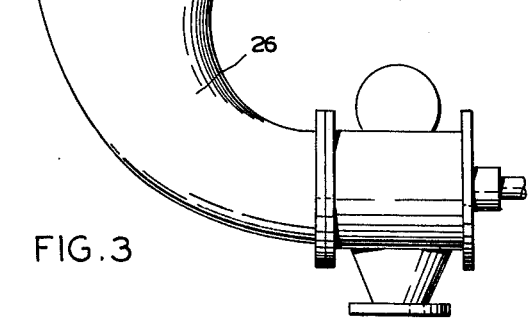
FIG. 3 illustrates the feeding of difficultly processed material.

For introducing charges which are viscous or do not flow at all, such as garbage, sugar cane or beets, molasses, pulp, sludge, etc., a funnel or hopper 26 may be charged at its open end 27 (FIG. 3) and passes the feed through 1 (FIG. 1a) or 13 (FIG. 2) into the housings 3 or 11, respectively. In the machine of FIG. 3, suction is applied over the whole cross section, and the shape of the chute 26 ensures sliding of the charge without blocking or agglomeration.

The machines shown in FIGS. 1–3 can be used also as washing machines. For instance in paper manufacture, rags may be charged at 27 and are ejected at 4 and 5 of FIG. 1. The wash liquid introduced at 27 is withdrawn through the apertures 6 and 8.

In the processing of wood pulp, the machines of the invention can be used as boilers. For this purpose, the shafts 2 or 19, respectively, have a concentric bore communicating with inner cavities in the rotors 1 or 14, 15 through which a heating agent, e.g. steam, can be introduced into the pump housing.

The heating agent can be mixed with detergents and/or chemical agents for bleaching, decomposing, or for carrying out other chemical processes. Reactants, catalysts, and any other reaction ingredients may be introduced through the hollow shafts into the pump housing for admixture to the charge drawn into the pump chamber.

All these considerations apply not only to the machine shown in FIGS. 1–3 but to all other embodiments of the invention.

If it is desired to control in a wash process the residence time of the charge in the machine and thereby the rate and degree of separation, there are two simple possibilities: Valves are inserted at the outlet of 4 at 5 and at the outlet of 8 (FIG. 1). If the outlet 4, 5 is throttled, the discharge of the material is slowed down and it revolves longer in the housing 3. Also additives, e.g. a detergent, remain longer in the housing 3, and also in the housing 7 if the outlet 8 is throttled by a valve.

A cycle process is indicated in FIG. 1a in broken lines. If the valve 29 for the outlet 4 is closed and the valve 30 is open, the pump operates as set forth hereabove. However, if valve 30 is closed and valve 29 is opened, the charge returns through conduit 31 into the pump chamber and circulates until valve 29 is closed and valve 30 is opened.

A similar arrangement can be provided at the outlet 8. A washing agent, for instance, can be recycled into the pump chamber through line 34 when valve 32 is closed and valve 33 is open; it can be re-used until the conduit 34 is closed and will then be drained off. Another possibility consists in recycling the washing agent through the hollow shaft 2.

The described arrangement may also be used to concentrate slurries and the like. The liquid is centrifuged by the impeller 1 through the apertures 6 into the outlet 8 while the thickened solids are withdrawn through outlet 4 and connection 5 (FIG. 1).

The considerations set forth hereinabove apply to all embodiments of the invention and will not be repeated to avoid undue length of the specification. It may only be added that the inclined impeller disc of the pump can be shaped and mounted in any manner disclosed in my prior patents recited herein.

Said prior disclosures already show perforations provided in the housing acting as straining means but they are located directly in the delivery path of the pump in front of the single upwardly directed pressure outlet. In contrast thereto, the machine according to the invention has an additional outlet cooperating with apertures provided in the wall of the pump housing rearwardly of the impeller, viewed from the suction inlet of the pump. As will be seen from FIG. 1, a favorable separation effect is obtained by the position of the openings 6 and outlet 8 in direction of the gravity forces.

Figure 5:
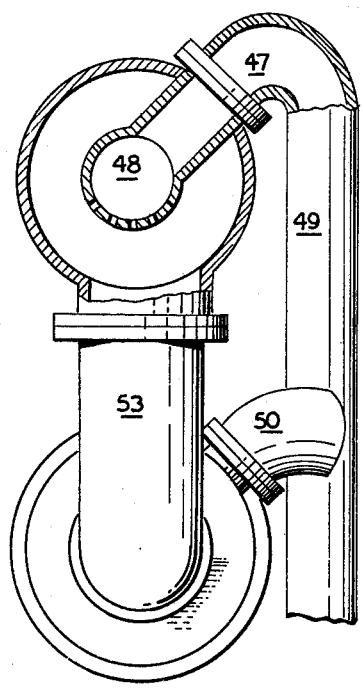
FIGS. 5 and 5a are similar to FIGS. 1 and 1a and show two of said machines in tandem arrangement, in front and side elevation.
Figure 5A:
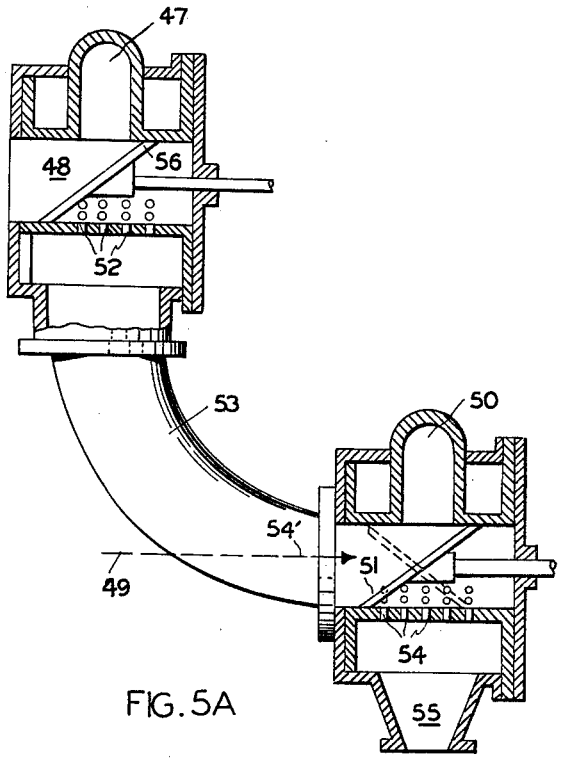
Figure 4:
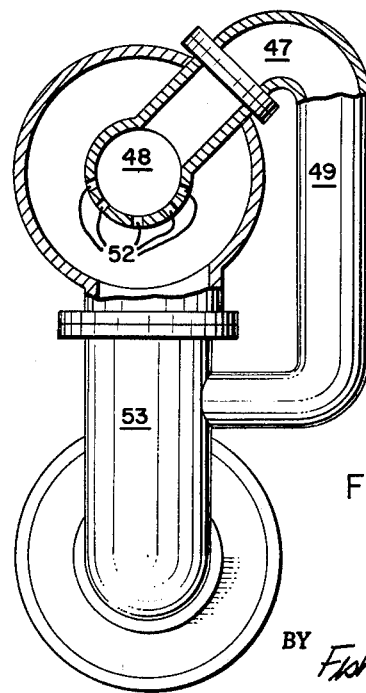
FIG. 4 is a side elevation of a modified form of the tandem arrangement of machines.

In the series arrangement of FIGS. 5 and 5a, the first machine forces the filtered or concentrated material from the pump chamber 48 through connection 47 into the down pipe 49, which may also be a horizontal conduit or may extend in any desired direction. The second machine operates in the same manner by passing the filtered material from the chamber 51 through the pressure outlet 50 into the line 49.

The filtrate 52 is withdrawn from the chamber 48 as set forth above. It flows through the conduit 53 into the pump chamber 51 and from there it passes through the apertures 54 as a twice fractionated filtrate into the outlet 55.

It is, of course, also possible to connect the elbow 47 and pipe 49 directly to 53 and to charge the chamber 51 not only with the filtrate of 53 but at the same time to introduce the filtered bulk material from 48, 47 once more through line 49 at 54'. In this case, it is often of advantage to offset the rotor 51' with respect to rotor 56 by 180°, as indicated in broken lines in FIG. 5a.

The manner of separation does not only depend on the shape of the perforations, e.g. of the apertures 6 in FIG. 1. Said apertures have, in all embodiments of the invention, in view of the specific problem involved, not only varying profiles (holes, slots, triangles, squares, polygons, ellipses, etc.) but also the position of their axes need not be radial to the center of the machine, like in FIG. 1. Inclined positions, particularly in the direction of rotation of the impeller, are often of advantage. Further, the cross section of the openings 6 need not be constant over the whole length of the perforation. Tests have shown that, for instance, in the extraction of hops in beer brewing, conical forms are quite satisfactory; thereby, the openings flare conically towards the outside.

Also the length of the perforations is important. On viewing, e.g., FIG. 1, it will be readily visualized that the working chamber 3 need not be simply perforated, as shown. Screening or straining inserts of various forms can be employed. Gauze or fabric screens can be used which are stretched over suitable supports. In a machine as shown in FIG. 1, for instance, circular or semicircular supports may be employed, also more or less fine-meshed grates can be used.

Also the dimensions of the straining, screening or filtering means are important. I prefer to use as the innermost sieve, i.e. on the smallest diameter, a coarse mesh which is followed outwardly by sieves of increasingly finer mesh.

For producing the desired effects, not only the parameters discussed hereinabove are of importance, but also the form and shape of the rotor.

It is a common feature of all the machines here disclosed that, without exception, they exert a pumping effect, for instance through 4 in FIG. 1, through 47, 50 in FIG. 5, or through 88 in FIG. 7. The desired graduation of the density or consistency is accomplished by a valve system as shown in FIG. 1a.

I claim:

1. A pump and strainer assembly comprises a stationary pump housing formed by walls defining first and second pump chambers therein, first and second impellers in said respective pump chambers rotatably mounted in series on a common drive shaft extending axially into said housing, said impellers being secured to said common drive shaft for rotation in planes inclined to said shaft, a shell enclosing at least a portion of said housing, said shell forming with the walls of said housing a separate chamber, an inlet for said first pump chamber, strainer passages in the impeller in said first pump chamber, said first impeller having a circumference substantially corresponding in each position of said impeller to the inner circumference of said first pump chamber, a perforated partition between said first and second pump chambers, strainer passages connecting said first and second pump chambers and said separate chamber, and an outlet for said separate chamber.

2. An assembly as claimed in claim 1 wherein said impellers are differently inclined with respect to their drive shaft.

3. An assembly as claimed in claim 1 wherein said drive shaft is hollow for introduction of an auxiliary agent into the pump chamber.

4. An assembly as claimed in claim 1 comprising a pipe connection from at least one of said outlets to said inlet and valve means in said connection.

5. An assembly as claimed in claim 1 wherein said strainer passages comprises perforations of different diameters than the peforations of the first impeller.

6. A pump and strainer assembly comprising a first and a second pump housing, each housing formed by walls defining a pump chamber therein, impellers rotating in said housings, drive shafts for said impellers extending axially into said housings, said impellers being secured to said shafts for rotation in planes inclined to said shafts, shells enclosing at least parts of said pump housings, said shells forming with the walls of said enclosed pump housings separate chambers, strainer passages in said pump housings connecting said pump chambers and said separate chambers, inlets for said pump housings, individual outlets each for said pump chambers and said separate chambers, a pipe connecting said individual outlets for the pump chambers, and a pipe connecting the outlet of the separate chamber associated with said first pump housing with the inlet for the pump chamber of said pump housing.

7. An assembly comprising a first and a second pump housing, each housing formed by walls defining a pump chamber therein, impellers rotating in said housings, drive shafts for said impellers extending axially into said housings, said impellers being secured to said shafts for rotation in planes inclined to said shafts, shells enclosing at least parts of said pump, said shells forming with the walls of said enclosed pump housings separate chambers, strainer passages in said pump housings connecting said pump chambers and said separate chambers, inlets for said pump housings, individual outlets each for said pump chambers and said separate chambers, a pipe connecting said outlet from said separate chamber of said first pump with the inlet of the pump chamber of the second pump housing, a pipe connecting the outlet of the pump chamber of said first pump housing with the inlet for the pump chamber of said second pump housing.

References Cited

UNITED STATES PATENTS

| | | | |
|---|---|---|---|
| 2,775,348 | 12/1956 | Williams | 210—94 |
| 911,802 | 9/1907 | Baldwin. | |
| 2,286,545 | 6/1942 | Hoehn | 241—86 X |
| 2,578,274 | 12/1951 | Weigham et al. | |
| 2,594,785 | 4/1952 | Meeker. | |
| 2,741,954 | 4/1956 | Allibe | 241—90 |
| 2,846,152 | 8/1958 | Brophy | 241—74 X |
| 2,943,800 | 7/1960 | Wultsch | 241—73 X |
| 2,956,503 | 10/1960 | Neidl. | |
| 3,067,960 | 12/1962 | Neidl | 241—255 |
| 3,113,734 | 12/1963 | Neidl | 241—74 |
| 3,154,464 | 10/1964 | Doosselaere | 241—80 X |
| 3,164,330 | 1/1965 | Neidl | 241—246 X |

FRANK T. YOST, Primary Examiner

U.S. Cl. X.R.

103—108; 241—86, 161, 163